(12) United States Patent
Landes (10) Patent No.: US 8,814,475 B1
(45) Date of Patent: Aug. 26, 2014

(54) DOCK SYSTEMS AND DOCK FENDERS

(76) Inventor: Scott D. Landes, Bloomington, MN (US)

( * ) Notice: Subject to any disclaimer, the term of this patent is extended or adjusted under 35 U.S.C. 154(b) by 209 days.

(21) Appl. No.: 12/927,326

(22) Filed: Nov. 13, 2010

(51) Int. Cl.
 *E02B 3/26* (2006.01)

(52) U.S. Cl.
 USPC ............ 405/215; 405/211; 405/212; 114/219

(58) Field of Classification Search
 USPC ........... 405/211, 212, 215; 114/219; 293/126, 293/128
 See application file for complete search history.

(56) References Cited

U.S. PATENT DOCUMENTS

| | | | | |
|---|---|---|---|---|
| 1,978,314 | A | * | 10/1934 | Lancaster ..................... 220/86.1 |
| 3,197,189 | A | * | 7/1965 | Pemper et al. ................. 267/140 |
| 4,515,502 | A | | 5/1985 | Kajigaya et al. .............. 405/215 |
| 4,804,296 | A | * | 2/1989 | Smath ............................ 405/212 |
| 4,964,760 | A | * | 10/1990 | Hartman ........................ 405/215 |
| 5,007,363 | A | * | 4/1991 | James ............................ 114/219 |
| 6,099,203 | A | | 8/2000 | Landes ............................ 404/10 |
| 6,289,835 | B1 | | 9/2001 | Silberman ..................... 114/219 |
| 6,783,303 | B2 | * | 8/2004 | Snyder .......................... 405/212 |
| 7,025,016 | B1 | | 4/2006 | Landes .......................... 116/209 |
| D525,721 | S | | 7/2006 | Landes ......................... D25/126 |
| 7,150,241 | B1 | * | 12/2006 | Boutaghou ................... 114/219 |
| 7,527,454 | B1 | | 5/2009 | Brushaber ..................... 405/215 |
| 2003/0218342 | A1 | * | 11/2003 | Jones ............................ 293/117 |
| 2004/0016382 | A1 | * | 1/2004 | Aschenbach ................. 114/219 |

OTHER PUBLICATIONS http://dictionary.reference.com/browse/resilient+?s=t.*
http://www.thefreedictionary.com/hang.*
http://www.thefreedictionary.com/coordinate.*
Dock Bumper Competitor Analysis (dates unknown).

* cited by examiner

*Primary Examiner* — Sean Andrish
(74) *Attorney, Agent, or Firm* — Jacobson & Johnson LLC (57) ABSTRACT

A flange free, semi-rigid resilient, hollow, dock fender having a skeletal triangular shape with a set of radiused edges and end fasteners to support the dock fender as the dock fender longitudinally and transversely distorts and flexes to distribute an impact force to protect objects proximate either side of an impact area on the dock fender with the skeletal triangular shape enabling use of low cost manufacturing techniques to form the dock fender from semi-rigid materials where the shape of the dock fender rather than the compressibility of the material of the dock fender enables the dock fender to absorb repeated impacts without damage to the dock fender and the securement of a hanger to end caps to a dock fender allows the dock fender to be used as a hanging dock fender, which inhibits rotation of the dock fender during an impact or the dock fender where the dock fender may or may not be in kit form.

21 Claims, 5 Drawing Sheets

DOCK SYSTEMS AND DOCK FENDERS

FIELD OF THE INVENTION

This invention relates generally to dock systems and, more specifically, to dock systems or dock fender kits to enhance the appearance of a dock as well as to protect boats and docks from damage during collisions of a boat with a dock.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of dock fenders for securing to a boat dock or hanging from a boat to protect the boat and the dock during collisions between the boat and the dock as a result of wind, waves or operator error are well known in the art. The dock fenders, which are supported along a rigid dock rail, while not subject to bending forces, are regularly subject to blunt force crush forces that collapse the dock fender on itself with the collapsing dock fender cushioning an impact between a boat and a dock. The dock fender should have sufficient resiliency to return to a preimpact condition without damage to the dock, the dock fender or the boat after the crush force is removed.

A survey of commercially available dock fenders or dock bumpers revealed over twenty different types of dock bumpers designed to absorb blunt force impact through the characteristics of the material or an arrangement of integral webs within the dock fender which are refereed to as a cell-type marine fenders. An example of a cell type dock fender, is shown in U.S. Pat. No. 7,527,454 and contains internal webs such an M-shaped web, which is positioned within the interior of the fender, to absorb a blunt force impact to the dock fender.

Another type of dock or marine fender, which has a solid interior, that relies on the characteristics of the material to absorb an impact, is shown in U.S. Pat. No. 4,515,502.

Prior art dock fenders, which rely on the characteristics of the material, usually have a rubber or rubbery elastic material with flanges to secure the marine fender to a deck. When impacted the inherent elastomeric properties of rubbery elastic material allow the collapse of the material to absorb the impact. While the dock fenders must be able to absorb repeated impacts it is also desired that the dock fenders have a finished appearance that does not conflict or detract from the visual appearance of the dock.

In some cases the prior art dock fenders have exposed features such as fasteners, which do not only detract from the visual appearance of the dock fender but may mar or scratch a boat during an impact with the dock fender as well as causing injury to a person accidentally bumping into the fasteners. In other cases the dock fenders lack visual appeal. The invention described herein has the ability to absorb repeated collisions that generate crushing forces on the dock fender while still providing a pleasing visually appearance of both the dock fender and the dock.

SUMMARY OF THE INVENTION

A hollow, flange free, semi-rigid resilient dock fender having a skeletal triangular shape with a set of radiused edges and end fasteners to hold the dock fender in a horizontal condition so that the dock fender longitudinally and transversely distributes an impact force to protect objects proximate either side of an impact area on the dock fender. The dock fender may be mountable in either of three different orientations with the skeletal triangular shape enabling use of low cost manufacturing techniques to form the dock fender from semi-rigid materials where the shape of the dock fender rather than the compressibility of the material of the dock fender enables the dock fender to absorb repeated blunt force impacts without damage to the dock fender. Securement of end caps to the dock fenders allows the dock fender to be used either as closed end dock mounted fender or as a vertical hangable dock fender, which inhibits rotation of the dock fender during impact between two objects. A further benefit of the invention is that dock fender can visually enhance the appearance of a dock either through shape or color or both since the dock fender can be coordinated with the color of the dock. In addition the dock fender can be used as a dock post cover to complement and further improve the visual appearance of the dock. A further benefit is the dock fender can be included as part of a dock fender kit that allows a user to select where and how the dock fender is used as well the color of a dock fender.

DESCRIPTION OF THE PREFERRED EMBODIMENT

Figure 1:
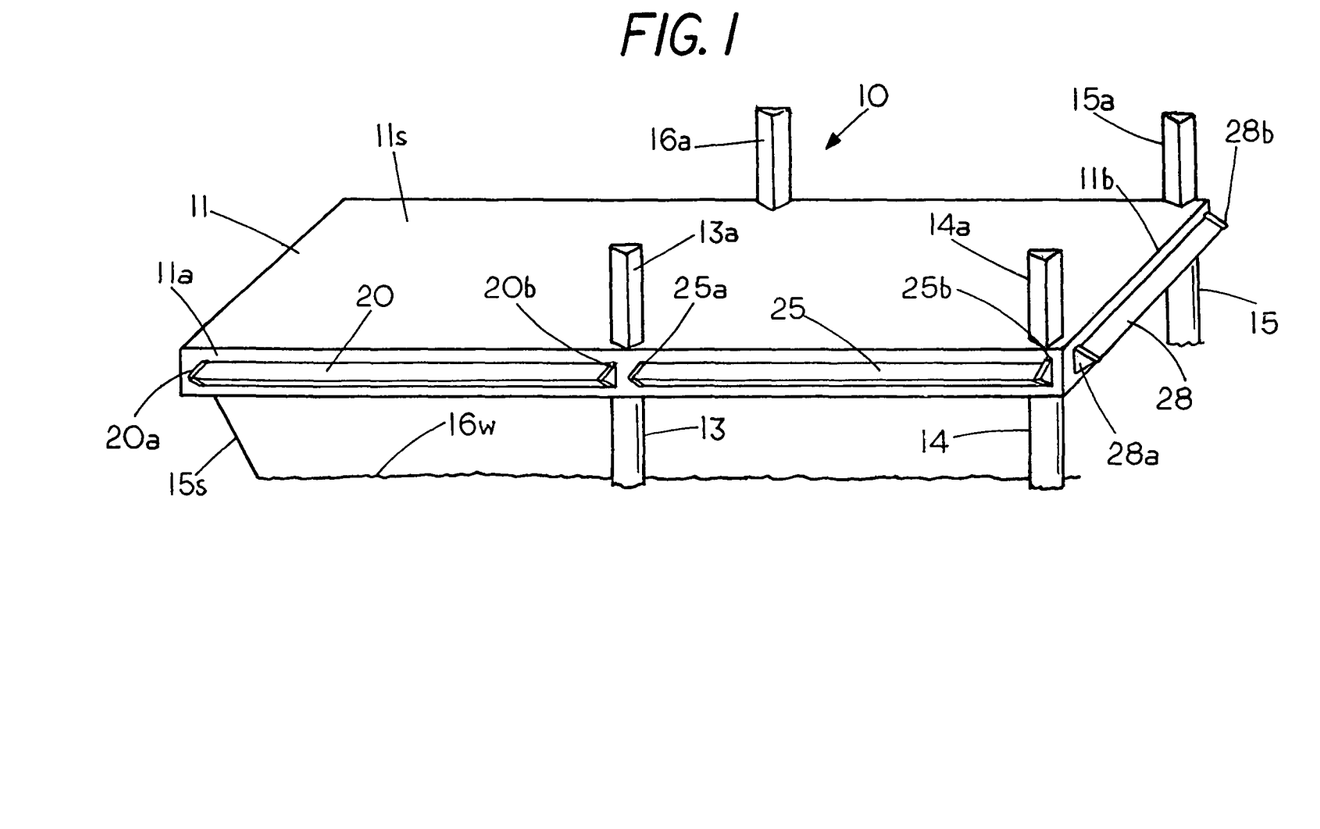
FIG. 1 is perspective view of a dock and boat protection system.
Figure 4:
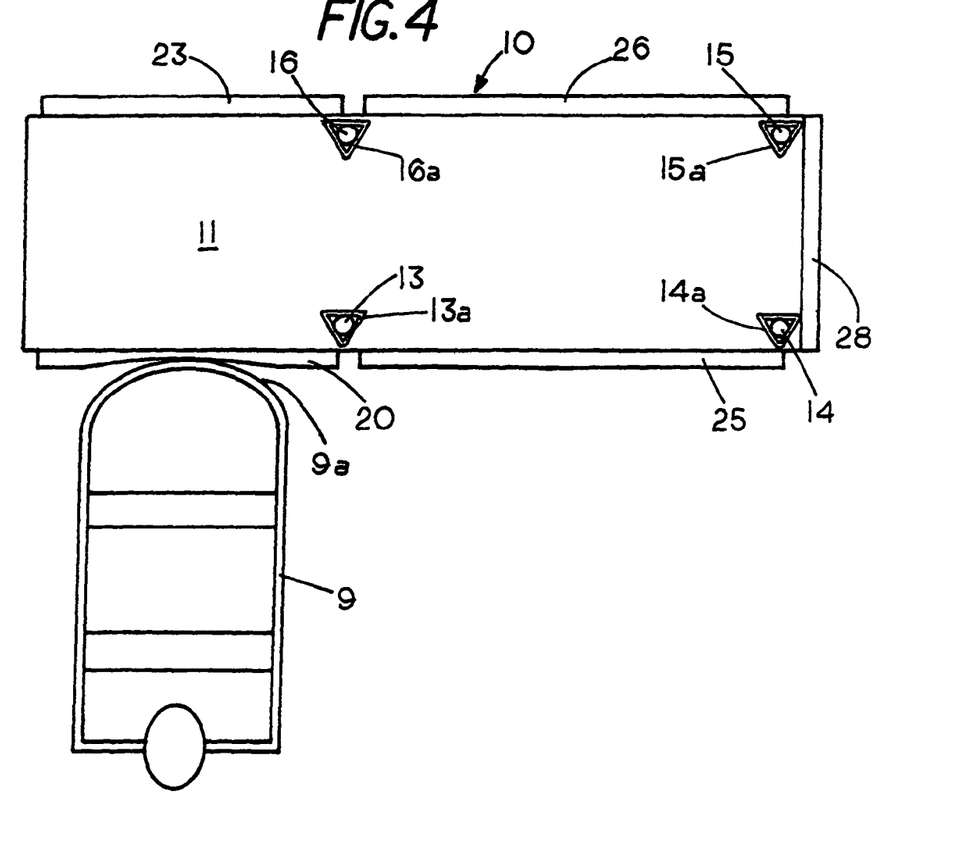
FIG. 4 is a top view of a deck at the moment of impact of a boat with the dock fender on the dock.

FIG. 1 shows a perspective view of a dock and boat protection system 10 while FIG. 4 shows a top view of the dock and boat protection system 10 comprising a dock 11 having a top surface 11s for walking on and a side rail 11a with the dock 11 supported on one end by shore 15s and the other end by vertical dock posts 13, 14, 15 and 16 with the lower ends of each of the vertical dock posts extending into the land located below a water line 16w. In this example the upper end of the dock posts are covered with the identical semi-rigid, resilient dock fenders that are located on the sides of the dock except the dock fenders located on the posts, which form dock post covers that can hide an unsightly dock post, may be retained on the dock posts by gravitational forces although if desired one may secure the dock post covers to the dock posts. In the example shown the dock post covers lack any end support and may have the ornamental visual appearance as shown in U.S. marking post design patent D525,721. In the example shown herein the dock post covers are supported on one end by the dock in an upright or vertical condition by the rigid dock post, which is located in the interior space of the dock fender. Extending horizontally in an end-to-end condition along side rail 11a is a first semi-rigid, resilient, dock fender 20 and a second semi-rigid, resilient dock fender 25 while a third semi-rigid, resilient dock fender 28 extends along an end rail 11b. Similarly, dock fender 23 and 26 are located along the opposite side of dock 10 as shown in FIG. 4. While the dock fenders may have the ornamental features of design patent D525,721 the dock fenders include end fasteners for securely holding a face of the dock fender against a dock rail to both prevent the dock fender from being torn from the dock during an impact between a boat and the dock fender and to allow the dock fender to absorb the impact without damaging the boat or the dock.

FIG. 4 shows a top view of dock 11 revealing semi-rigid, resilient dock fenders 23 and 26, which are identical to dock fender 25 and 26, extending along the side rails on the opposite side of the dock 11. The dock fenders extend along the sides and the end of dock 11 to form a peripheral dock protection system to protect both the dock and the boats from blunt force impacts. While FIG. 4 shows the dock fenders extending around the entire periphery of the dock in some cases a dock fender may extend along only one side of the dock.

FIG. 1 shows dock fender 20 having a first end with a triangular shaped end cap 20a on one end and a triangular shaped end cap 20b on the opposite end with each of the end caps secured to dock fender 20 through fasteners such as expandable rivets or the like. Likewise dock fender 25 includes an end cap 25a on one end and an end cap 25b on the opposite end. Similarly, dock fender 28 includes a dock end cap 28a on one end and a dock cap 28b on the opposite end. Although a fastener such as an expanding rivet may be used to secure an end cap to the end of a dock fender other types of fasteners may be used to secure the end caps to the dock fender without departing from the spirit and scope of the invention described herein, for example screws, adhesives or a friction fit between end cap and the dock fender. While end caps are shown to close off the end openings on the dock fender it should be understood that in some cases one may prefer to have open ended dock fenders and therefore not use end caps. In other cases as described herein the end cap can become a mounting member for securing a face of the dock fender in a face-to-face condition with a dock rail on a dock.

Figure 2:
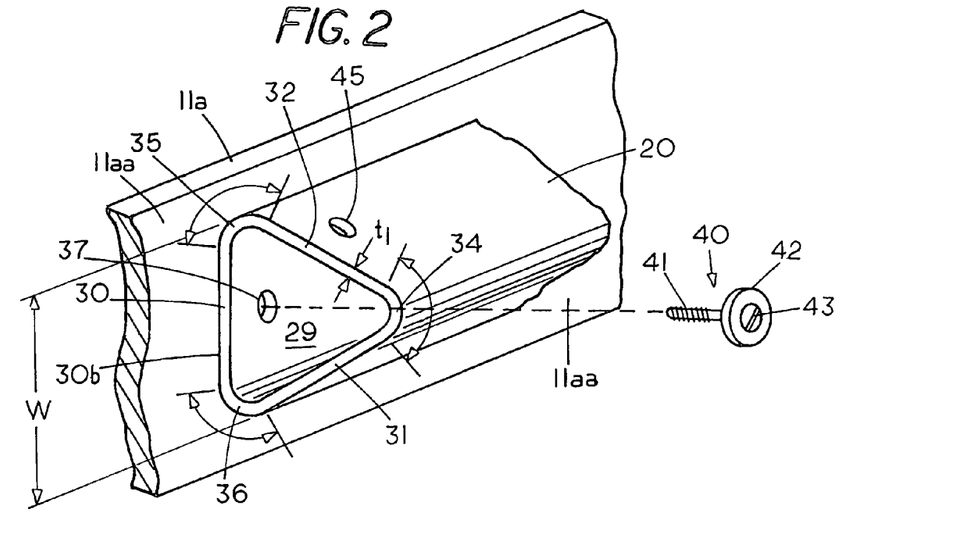
FIG. 2 is an enlarged partial sectional and exploded view of a dock fender secured to a dock side rail.

FIG. 2 shows a partial sectional view of side rail 11a having a face 11aa with a polypropylene semi-rigid dock fender 20 secured thereto. In one example dock fender 20 comprises a set of three elongated flat panels 30, 31 and 32 which extend longitudinally along dock fender 20 with each of the elongated flat panels 30, 31 and 32 having opposed edges that are integrally joined to an adjacent elongated flat panel by a radiused edge 34, and 36 to form a one-piece semi-rigid triangular shaped dock fender having a single hollow interior space therein. The radiused edges are generally defined by the curved portion of the dock fender that is located between the arrows as shown in FIG. 2. The semi-rigid feature allows the dock fender not only to appear as a bold structure that enhances the appearance of the dock but also allows the dock fender to maintains its shape without sagging or fading. In addition the use of polymer plastic such as polypropylene allows one to introduce any of a number of different colorants directly into the dock fenders. The ability to introduce a colorant directly into the dock fender allows one to color coordinate a dock fender with the color of the dock. A feature useful in neighborhoods where restrictions are placed on the appearance of dock. For example, in some cases one may want the dock fender to blend into the dock so as not to be visible from a distance and in other cases one may want the dock fender to stand out to alert a boater to the presence of a lake hazard. With the invention described herein the color can be selected to meet the desired dock use by a dock owner.

As shown in FIG. 2 elongated panel 30 of dock fender 20 has an exterior face 30b abutting a face 11aa of side rail 11a with the other elongated flat panels 31 and 32 extending outwardly in a non-normal direction from the dock rail 11a in a position to form a V shape where two of the three panels can transversely and longitudinally distort and flex to absorb a normal impact force, which may be a component of an impact force to the dock fender 20. In the example shown the thickness $t_1$ of the dock fender 20 is uniform throughout the dock fender which provides an impact neutral feature to the dock fender that allows the dock fender to mounted with any of the flat panels abutting a side rail of a dock as well as ensures that impacts on the dock fender have the same degree of resistance to an impact. In the example shown in FIG. 2 the dock fender 20 consists of the first elongated panel, the second elongated panel, the third elongated panel, the first radiused edge, the second radiused edge and the third radiused edge formed into a semi-rigid one-piece hollow, polypropylene dock fender free of exterior flanges and interior webs. While the size of the dock fender will depend on the types of impact the dock is subjected in order to provide sufficient area for contact the width W of the panel should in most cases be a minimum of about two inches so as to provide impact resistance to smoothly decelerate an object such as a boat that impacts the dock fender, however, one may determine the width based on the expected use.

A feature of the dock fender 20 is that the hollow interior space 29 of the semi-rigid dock fender is free of internal supporting webs and that the material of the dock fender lacks elastomeric compressibility to absorb impacts. FIG. 2 shows, dock fender 20 has a skeletal shape and more specifically an elongated skeletal triangular shape or three sided shape that is both flange free on the exterior and web free on the interior of the dock fender 20. The three-sided shape may take the form of an equilateral triangle or an isosceles triangular with the dock fender in the form of an equilateral triangle allowing the dock fender to have the same profile when mounted on either of the faces of the dock fender. Conversely, the use of a dock fender with non-equilateral shape such as an isosceles triangle allows one to choose between different profiles thus providing the user the option of better mating the dock fender to the dock. In still other cases one may want to have each of the sides of unequal lengths.

To secure the dock fender 20 to the dock one may use a set of mounting members comprising interior fasteners which in one example are located at least partially in an interior space of the dock fender with each fastener in the set of fasteners extending through one of the three elongated flat panels abutting the side rail and into the side rail to secure the dock fender directly to the side rail. FIG. 2 shows an example of a fastener 40 comprising a washer 42, a screw thread 41 and a slotted screw head 43 which are shown in a condition for extending through a hole 37 in panel 30. By extending the screw thread 41 through the hole 37 in panel 30 and into the rail 11a one can secure the end of dock fender 20 to the side rail 11a. In the assembled condition fastener head 43 and washer 42 are located in the hollow interior space 29 of dock fender 20 with the screw thread 41 of the fastener 40 extending through flat panel 30 and into the side rail 11a abutting the flat panel 30 to secure the dock fender 20 thereto. Securing the flat panel 30 to an exterior face 11a of the side rail 11a enables the semi-rigid dock fender 20 to resiliently absorb impacts, such as blunt force impacts, without breaking. That is the flat panel 30 abutting the side rail 11a resists displacement since it is supported by the side rail while the other sides 31 and 32 of the dock fender 20 flex and bend in response to an impact.

An identical or similar fastener may be used to engage the other end of the dock fender 20 to enable the dock fender to be supported in a condition parallel to the water line 16w so that an impact from a boat can be absorbed by the dock fender without damaging the boat or the dock. A feature of the invention is that the semi-rigid dock fender may be solely supported on its ends, when the dock fender is extended horizontally, since the semi-rigid structure can support its own weight. While a set of end fasteners is shown in some cases a single fastener may be used to support the dock fender. A feature of the attachment of the semi-rigid dock fender 20 with interior fasteners is that no exterior flanges are needed to support the dock fender on the dock rail thus a clean modern appearance to the dock fender. A further feature of the invention is that the heads of the dock fender fasteners are located internally of the dock fender thus virtually eliminating the chances of the heads of the fasteners accidentally scraping or marring a boat during an impact condition.

Thus, the dock and boat protection system 10 shown in FIG. 1 includes a dock 11 having a top surface 11a and side and end rails with each having a face for supporting a set of dock fenders with each of the dock fenders having a first end and a second end with a set of three elongated flat panels extending therebetween with. Each of the elongated three flat panels having opposed edges being integrally joined to an adjacent elongated flat panel by a radiused edge to form a skeletal triangular shaped dock fender having a hollow web free interior with one of the three elongated panels having an exterior face abutting the faces of the end rails with the other two of the three elongated flat panels extending outwardly in a non-normal direction from the dock rail to longitudinally and transversely flex when absorbing a normal impact to the dock fender. An advantage of use of panels which extend at different angles from the dock as well as at non normal angle to the dock face ensures that a normal impact to the dock fender from a boat or the like results in longitudinal flexing of the flat panels rather than a direct local compression thus permitting the skeletal structure of the dock fender to absorb the shock through flexing and bending rather than local compressive resiliency found in dock fenders made from elastomers or the like. Consequently, the skeletal dock fender, which is made from a semi-rigid material, described herein allows one to produce a resilient dock fender even though the material of the dock fender may lack elastomer compressibility.

Figure 3:
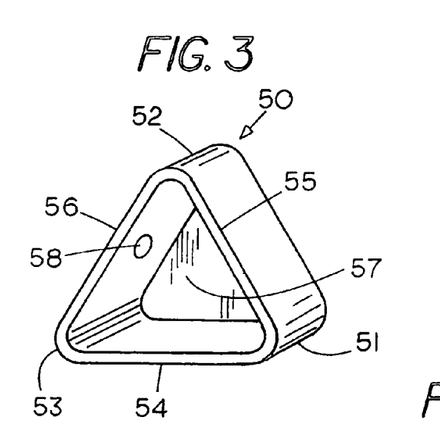
FIG. 3 is an end cap for placing over the dock fender of FIG. 1.

FIG. 3 shows an example of end cap 50 having a matching profile of dock fender 20. That is, end cap 50 includes panels 54, 55 and 56 which are joined by radiused edges 51, 52 and 53 to form a triangular shaped member with a further triangular shape panel 57 extending from side to form an end cap that can be placed over an open end of the dock fender 20. In the example shown end cap 50 includes an opening 58 and dock fender 20 includes a mating opening 45 for locking the dock fender 20 to end cap 50 with a fastener such as an expandable rivet.

Figure 3A:
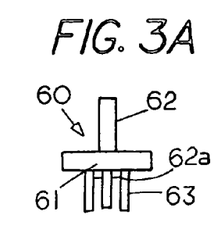
FIG. 3A is a front view of a rivet in an unexpanded position.
Figure 3B:
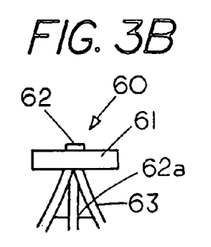
FIG. 3B is a front view of a rivet in an expanded position.

An expandable rivet 60 is shown in an unexpanded condition in FIG. 3A and comprises a stem 62 a flange 61 and a set of radially expandable legs 63. FIG. 3B shows the expandable rivet 60 in the expanded condition with legs 63 splayed radially outward by the end 62a. Typically, the end cap 50 is placed on dock fender 20 and the expandable legs 63 are extended trough the opening 58 in end cap 50 and the opening 45 in dock fender 20. By pounding or pushing the end of stem 62 until the end of stem 62 is flush causes the lower end 62a of stem 62 to splay the legs 63a outward to hold the end cap 50 on dock fender 20. While an expandable rivet is shown to secure the end cap 50 to the dock fender other mechanical methods of securing including a friction fit could be used as well as adhesives or the like. Similarly, an identical end cap may be placed on the opposite end of a dock fender to form a dock fender having a hollow web free chamber therein wherein the sole resistance to impact derives from the skeletal shape. While end cap is shown fitting over the exterior end of the dock fender if desired the end cap may be placed on the interior end of the dock fender.

FIG. 4 shows a top view of dock 11 with dock 11 having a set of dock fenders 20 and 25 located in an end-to-end condition on one side of dock 11 and a set of dock fender 23 and 26 located in an end-to-end condition on the opposite side of dock 10. A further dock fender 28 is located on an end of the dock 11 that extends over the water. To illustrate the operation of the invention a boat 9 is shown with its hull 9a impacting and partially collapsing dock fender 20 by introducing a blunt force i.e. crush force in a direction normal to the dock fender 20.

A feature of the invention is that the dock fenders can be used to enhance the appearance of the dock support posts that project above the top of the dock. FIG. 4 shows a dock fender which has been placed around a dock post 13 to form a dock post cover 13a. Similarly, located around the top of dock post 14 is post cover 14a, located around the top of dock post 15 is a post cover 15a, and located around the top of dock post 16 is a post cover 16a all of which have been formed from a basic triangular shaped dock fender. While the dock post covers may have a portion of an outward triangular shape similar to the well known triangular marking posts shown in the inventors U.S. Pat. Nos. 7,025,016; 6,099,203 and design patent D525,721 it should be pointed out that triangular shaped dock post covers, which are used to provide a formal or finished appearance to a dock, are supported in an upright condition on an end of the dock fender and are inhibited from lateral displacement by a dock post extending lengthwise within the dock post cover while in contrast a marker post is end supported in an upright condition by soil which is compacted around an end of the marker post to provide a cantilever like support.

Figure 5:
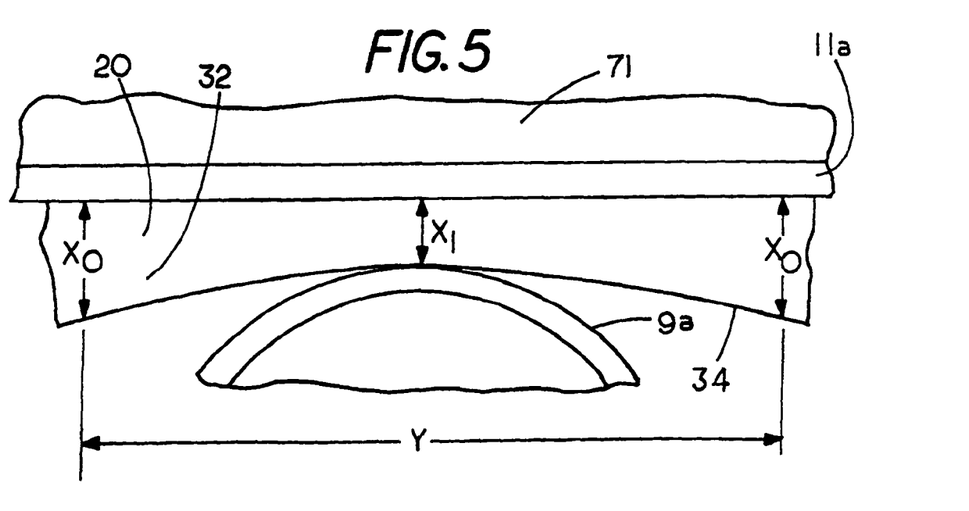
FIG. 5 is an enlarged view of a portion of FIG. 4 to illustrate the impact region on the dock fender.

FIG. 5 shows an enlarged top view of FIG. 4 at the moment of impact between boat hull 9a and dock fender 20, which is supported by dock rail 11 a. The dock fender 20, which is supported by a dock rail 11a, while not subject to bending forces, is regularly subject to crush forces that collapses the dock fender on itself as viewed in FIG. 6. In response to a crush force the top panel 32 flexes out of its plane during the impact on the radiused edge 34. Similarly the lower panel 31, which is shown in FIG. 2, also flexes out of its plane during the impact on the radiused edge 34. The panel 30 which abuts the dock rail is limited from flexing out of its plane by the face-to-face support form the dock rail 11a. Because the elongated panel 30 of dock fender 20 is secured to rail 11 and flat panel 30 is secured to panels 32 and 31 the force of the impact is transmitted both normal to the rail 11 as well as along a longitudinally axis of the dock fender 20 through the flexing and bending of the upper and lower panels 32 and 31. That is the V shape of the upper and lower panels allows the upper and lower panels to flex and distort both transversely and longitudinally when absorbing a normal impact to an apex of the V shape formed by the upper and lower panels.

In the examples shown the panels are semi-rigid flat panels and an impact to the dock fender is absorbed solely or substantially solely by a flexing of a skeletal shape of the dock fender as opposed to an elastomeric compression of the material. Reference $x_i$ indicates the point of maximum bending of the panel 32 and panel 31. Since the panels are elongated and secured by the radiused edges the upper and lower panels 31 and 32 not only flex at the point of impact but continue to flex and resist the impact as one proceeds longitudinally outward from the point of impact. The reference $x_o$ indicates points where the deflection of the panels 32 and 30 are no longer measurable. The distance Y indicates that the impact is being absorbed not only at the immediate point of contact but longitudinally along the top panel 32 and longitudinally along a corresponding lower panel 31 by the flexing of the skeletal frame of the semi-rigid dock fender 20. Consequently, a feature of the invention is the ability to absorb impacts not only at the point of contact but to distribute the impact forces to sections of the flat panels and radiused edges that extend longitudinally outward from the point of contact.

Thus a feature of the invention is a method of protecting a boat or a dock from an impact by placing a semi-rigid elongated flat panel of a skeletal triangular shape dock fender against a face of a dock rail and securing the semi-rigid elongated flat panel of the skeletal triangular shape dock fender to the dock rail with a radiused edge of the triangular shaped dock fender extending outward from the face of the dock rail. By extending a fastener through the flat panel and placing an end cap over an open end of the dock fender one can conceal the fastener and prevent the fastener from marring or scratching an object that impacts the dock fender. With the dock fender described herein the sole or substantial absorption of an impact by the dock fender can be obtained through the flexing of the panels of the dock fender. The dock post cover, which is not subject to boat impacts, may have an identical cross sectional shape to provide a dock protection system which is not only functional but decorative. Thus a feature of the invention is a dock fender kit which includes a triangular shaped dock fender and a set of end fastener which to allow the user the option to mount the dock fender either on the side rails of the dock with the end fasteners or around the dock post cover without the end fasteners, however, in some cases the user may want to secure the dock post cover to the dock post or the dock to prevent rotation of the dock post cover during windy conditions. The dock fender kit provides a user with a dock fender that includes options on both the use and the support of the dock fender as part of dock protection system.

Figure 8:
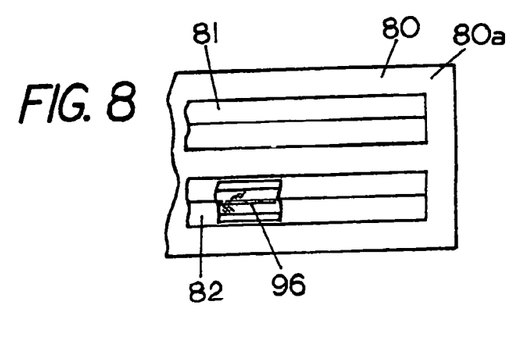
FIG. 8 is a partially view showing the placement of two dock fenders located in a parallel condition on the dock.
Figure 8A:
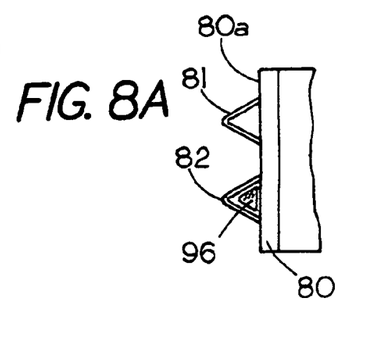
FIG. 8A is an end view of the dock fenders of FIG. 8.

A further feature of the invention is the ability to change the impact absorbing capability of the dock fender by inserting an impact absorbing material 96 into an interior hollow of the dock fender 82 as illustrated in FIG. 8A. An example of a suitable material is a closed cell polyethylene member, preferably having the same shape as the interior hollow in the dock fender. By inserting an elongated impact absorbing material one can have a dock fender with a different impact absorbing ability without changing the appearance of the dock fender. For example, one side of the dock may be subject to hard impacts from larger boats while another side may be subject to lesser impacts from smaller boats. A benefit of dock fenders described herein is that it can be tailored to accommodate impacts of different intensities without having to change the appearance of the dock fenders by merely placing a hidden impact absorbing material in the interior of the hollow dock fender.

Figure 6:
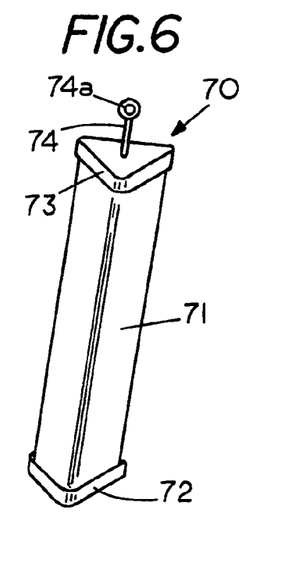
FIG. 6 is a perspective view of dock fender that one can hang from a dock or boat.

FIG. 6 shows an example of a dock and boat protection system 70 that comprises a dock fender 71, which may be suspended from a side of a boat or a dock to absorb impacts. In this example only a portion of the dock fender may be supported by a dock rail during an impact, however the forces are still capable of being absorbed longitudinally since at least a portion of the side rail supports the dock fender. Dock fender 71 includes an end support or end fastener comprising an extension 74 with a loop 74a for tying a rope or the like thereto. Securement of end cap 73 with a loop fastener 74a allows the dock fender 71 to be used as a hanging dock fender which inhibits rotation of the dock fender during an impact. That is, with a conventional round hanging dock fender an impact of an object with the dock fender may cause the dock fender to roll between the dock and the boat thus allowing the boat to come into contact with the dock resulting in damage to either the dock or the boat or both. An end fastener such as a loop fastener or other support means may be attached to the end cap 72 of dock fender 71 to enable the dock fender 71 to be suspended from either end. In an alternate embodiment the end fastener may include an end cap for engaging an end of the dock fender so that the dock fender can be supported in a vertical condition by hanging the dock fender from the end fastener.

Figure 6A:
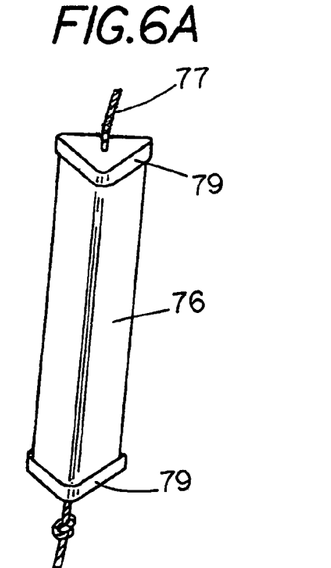
FIG. 6A is a perspective view of another example of a dock fender that one can hang from a dock or boat.

FIG. 6A shows another example of a hangable dock fender 76 with the dock fender having a set of end caps 79 with an end support provided by a rope 77 extending longitudinally therethrough with the rope having a knot therein to prevent withdrawal of the rope from the dock fender. While a knot is shown other means of retaining the rope on the dock fender may be used without departing from the spirit and scope of the invention.

Figure 7:
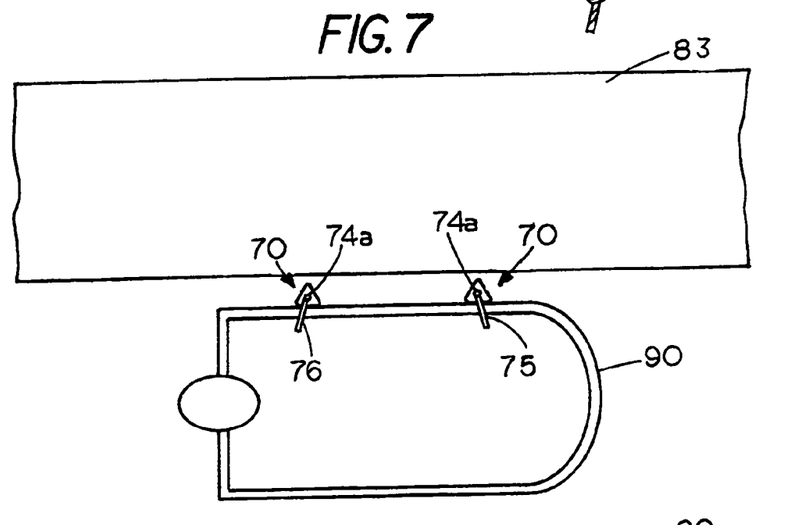
FIG. 7 is a top view of dock fender hanging between a boat and a dock.

FIG. 7 shows a dock 83 and a boat 90 with boat 90 having a first fender 71 suspended from boat 90 by rope 76 and a second fender 71 suspended by a rope 75 so that an impact between the boat 90 and dock 80 can be absorbed by the dock fenders 71.

FIG. 8 shows another example of how the dock fender may be used to enhance the impact resistance on docks where the point of impact may occur at different elevations. In this example the dock sideboard 80 has dual dock fenders 81 and 82 secured to the face 80a of the dock sideboard with one of the dock fenders located above the other dock fender. FIG. 8A is an end view of the dock fenders of FIG. 8 showing another feature of the invention namely the ability to change the impact absorbing ability of the dock fender by inserting a second impact absorbing material 96 in the hollow interior of dock fender 82.

Figure 9:
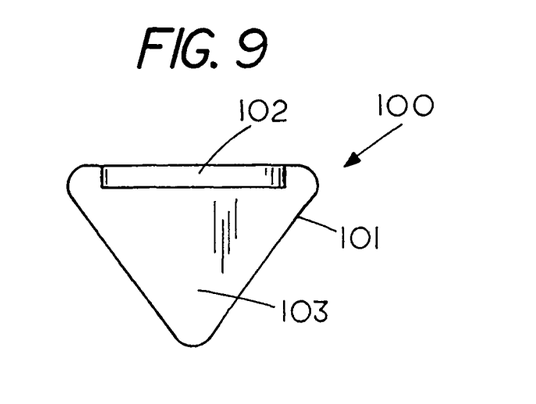
FIG. 9 is a top view of an end cap for securing the dock fender.

FIG. 9 shows a top view of another examples of a mounting member 100 for supporting an end of dock fender against a rail. Member 100 includes a top end surface 103 and a lateral lip 101 that extends around the periphery of the mounting member. An integral tab 102 extends at a right angle outward from the top of the mounting member with the backside of the tab flush with the outside surface of the lateral lip 101.

Figure 10:
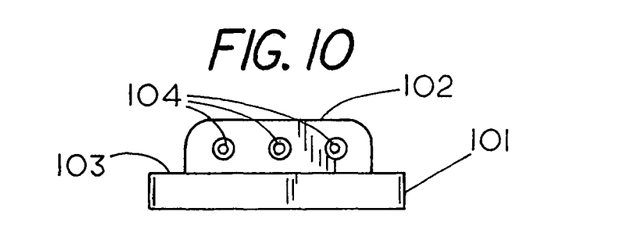
FIG. 10 is a front view of the end cap for securing the dock fender.

FIG. 10 shows a front view of the mounting member 100 revealing three openings 104 in tab 102 for securing a fastener therethrough.

Figure 11:
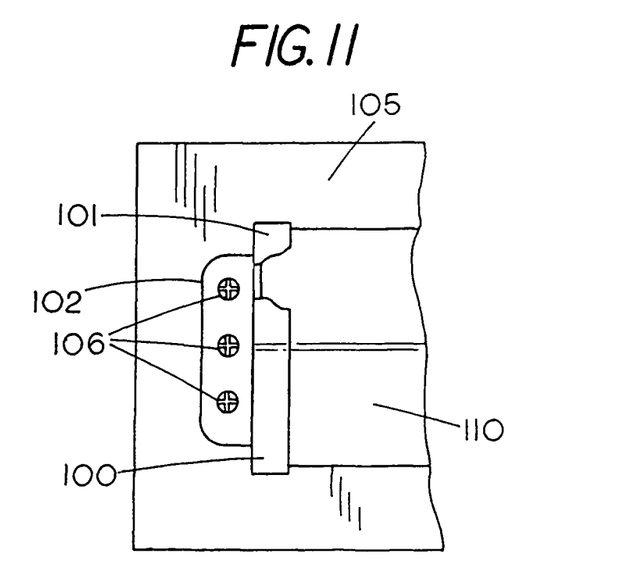
FIG. 11 is a partial view of a dock fender supported on a dock rail by the end cap of FIG. 9.

FIG. 11 shows a partially cut away view of the mounting member 100 mounted on the end of a dock fender 110 with the lip 101 of mounting member 100 located around the exterior surface of the dock fender 110 to laterally restrain the dock fender therein. A set of screws or fasteners 106 extend through the tab 102 and into a rail 105 to hold the mounting member 100 in position while the lip 101 extends around the end of the dock fender 110 to hold the dock fender in a fixed horizontal position on the dock rail 105. An identical mounting member can be used to support the opposite end of the mounting member.

FIGS. 9-11 show a single tab extending partway across the member 100 with provision for multiple fasteners therein. It should be understood that the width of the tab may increase or decrease and the number of fasteners used to secure the mounting member to the dock fender may also be increased or decreased without departing from the spirit and scope of the invention. A feature of the mounting members and the dock fenders described herein is that the dock fenders, while yieldable to impacts, can be supported solely by a mounting member located at each end of the dock fender.

I claim:

1. A dock and boat protection system comprising:
   a dock having a top surface and a side rail having a side face;
   a semi-rigid, resilient dock fender located above a body of water with the dock fender having a first open end and a second open end with a set of three elongated flat panels having the same thickness extending therebetween, each of said three elongated flat panels lacking elastomeric compressibility, each of said three elongated panels having opposing elongated edges that are integrally joined to the elongated edge of an adjacent elongated flat panel by an impact absorbing radiused edge to form a triangular shaped dock fender having an elongated skeletal triangular shape with a uniform thickness and uniform impact absorption, said one of said three elongated flat panels having a fastener hole proximate the first open end of said dock fender for dock fender securement to the side rail of the dock and to an exterior panel face that abuts the side face of said side rail in a face-to-face condition with the other two of said three elongated flat panels extending outwardly to form a V shape so that the other two of said three elongated flat panels transversely and longitudinally distort and flex when absorbing a normal impact to the dock fender; and
   a mounting member comprising a fastener securing the dock fender to the dock rail, through a lateral insertion of the fastener into the first open end of the dock fender and into an interior space of said dock fender and through the first hole proximate the first end so that the fastener engages both the elongated flat panel abutting the side rail and the side rail to secure the dock fender to the side rail in a condition wherein the fastener is shielded from direct contact with an object impacting an exterior surface of the dock fender and the fastener hole.

2. The dock and boat protection system of claim 1 including;
   a first end cap extending over the first open end of the dock fender to form a closed end dock fender and a further fastener extending through a hole in said end cap and a hole in one of said flat panels other than the flat panel in engagement with the side rail to thereby secure the end cap to the dock fender.

3. The dock and boat protection system of claim 1 wherein the dock includes a further set of exposed side rails with each of the exposed side rails and the side rail including horizontally extending dock fenders located in an end-to-end condition thereon with each of the dock fenders supported solely by a mounting member located at each end of the dock fender.

4. The dock and boat protection system of claim 1 including a flange free exterior on the dock fender and the dock includes at least one vertical extending dock support post; and a dock post cover thereon with the dock post cover comprising a further dock fender gravitationally or fixedly held in a vertical position around an exterior surface of said at least one vertical extending dock support post to form a decorative cover to provide a matching decorative appearance to the dock fender on said dock and boat protection system.

5. The dock and boat protection system of claim 4 wherein the dock fender and the further dock fender include a web free hollow interior with the sole absorption of impact obtained by a flexing of a triangular skeletal structure of the dock fender and the dock fender has a width W of at least two inches.

6. The dock and boat protection system of claim 5 wherein the further dock fender is made from a material that lacks elastomeric compressibility to absorb an impact.

7. The dock and boat protection system of claim 4 wherein the sole or substantial absorption of an impact of the dock fender and the further dock fender is through the flexing of the panels of the dock fender and the dock post cover and the dock fender have an identical cross sectional shape.

8. A semi-rigid, resilient marine dock fender kit engageable either with a dock rail to absorb impacts thereon or positionable around a dock post to form a dock post cover with a dock fender located above a body of water comprising:
   a first elongated flat panel having a pair of elongated opposed edges, said first elongated flat panel having a hole and a further hole therethrough;
   a second elongated flat panel having a pair of elongated edges
   a third elongated flat panel having a pair of elongated edges, each of said elongated flat panels having a uniform thickness;
   an impact absorbing first radiused edge integrally joining one of the pair of elongated opposed edge of said first flat panel to said third flat panel;
   an impact absorbing second radiused edge joining one of the pair of elongated edges of the second flat panel to said first flat panel;
   an impact absorbing third radiused edge integrally joining one of said pair of elongated edges of said second flat panel to one of said elongated edges of said third flat panel to form a skeletal triangular shape having a uniform thickness and uniform impact absorption so that an impact on one of said radiused edges is absorbed by a flexing of at least two of said flat panels along a longitudinal axis of the dock fender; and
   an end fastener for extending through the hole in the first elongated panel and a further end fastener for extending through a further hole in the first elongated panel for engaging opposite ends of the dock fender wherein the dock fender is supported either in a horizontal condition on the dock rail with the end fastener or used as a dock post cover without the end fastener.

9. The dock fender kit of claim 8 wherein the dock fender consists of the first elongated panel, the second elongated panel, the third elongated panel, the first radiused edge, the second radiused edge and the third radiused edge formed into a semi-rigid one-piece hollow, polypropylene dock fender free of exterior flanges and interior members.

10. The dock fender kit of claim 9 wherein the dock fender has an elongated triangular shape and an interior has a hollow, web free elongated triangular shape and an end cap on each end with the end fastener comprises a flexible member extending lengthwise through the dock fender to enable hanging the dock fender in a vertical orientation.

11. The dock fender kit of claim 8 wherein each of the panels are semi-rigid flat panels and an impact to the dock fender is absorbed solely by a flexing of the skeletal shape of the dock fender and the dock fender includes a set of fasteners for extending through a set of holes in only one of the panels for securing ends of the dock fender to the dock rail.

12. The dock fender kit of claim 8 wherein the dock fender includes an end cap on each end and an interior fastener for extending through a panel of the dock fender to mount the dock fender in an impact condition on an exposed face of the dock rail and an exterior surface of the dock-fender is free of flanges.

13. The dock fender kit of claim 8 wherein each of the panels consists of elongated polypropylene panels with a mounting member comprising an end cap secured to at least one of the panels with an expandable rivet located in an opening in the end cap and the at least one of the panels to maintain the end cap thereon.

14. The dock fender kit of claim 8 wherein the dock fender includes a first end cap on a first end cap of the dock fender and a second end cap on a second end of said dock fender whereby only two of the three elongated panels flex along a longitudinal axis of the dock fender in response to an impact on the radiused edge therebetween.

15. The dock fender kit of claim 8 wherein the dock fender comprises polypropylene and includes a first end cap on a first end of the dock fender and a second end cap on a second end of said dock fender and an end support extending from either said first end cap or said second end cap or both whereby the dock fender is hung in a vertical orientation from a dock or a boat to absorb impacts therebetween to enable two of the three elongated panels to flex longitudinally from a point of contact in response to an impact thereon.

16. The dock fender kit of claim 8 wherein the dock fender is a hangable dock fender having an end support for suspending the dock fender from a dock or a boat in a vertical condition to inhibit or prevent the dock fender from rolling away from a point of contact to ensure that an impact force is absorbed by the dock fender and an interior of the dock fender includes a shock absorbing material to increase the impact resistance of the hangable dock fender.

17. A method of protecting a boat or a dock from an impact comprising;
  placing a semi-rigid elongated flat panel of a skeletal triangular shaped marine dock fender having a first open end and a second open end and having a uniform thickness and uniform impact absorption throughout said skeletal triangular shaped marine dock fender against a face of a dock rail with the first open end and the second open end of said semi-rigid elongated flat panel each having a hole located proximate thereto; and
  extending a first fastener into said first open end of the skeletal triangular shaped marine dock fender and through said hole on the semi-rigid elongated flat panel proximate said first open end and extending a second fastener into a said second open end of the skeletal triangular shaped marine dock fender and through the said hole on the semi-rigid panel proximate said second open end to secure the semi-rigid elongated flat panel of the skeletal triangular shaped marine dock fender to the dock rail with an impact absorbing radiused edge of the triangular shaped marine dock fender extending outward from the face of the dock rail in a position to resiliently respond to an impact thereon.

18. The method of claim 17 including the step of placing the semi-rigid elongated panel in a horizontal condition along the face of the dock rail.

19. The method of claim 17 including the step of placing a further triangular shape dock fender around a vertically extending dock post located above a dock surface to form a dock post cover with the dock post cover and the dock fenders forming a decorative dock protection system.

20. The method of claim 17 including the step of changing the impact absorbing capability of the dock fender by inserting an impact absorbing material into an interior hollow of the dock fender.

21. A semi-rigid, resilient marine dock fender located above a water line comprising:
  a first elongated flat panel having a pair of elongated opposed edges;
  a second elongated flat panel having a pair of elongated edges;
  a third elongated flat panel having a pair of elongated edges, each of said elongated flat panels having a same uniform thickness;
  an impact absorbing first radiused edge integrally joining one of the pair of elongated opposed edge of said first flat panel to said third flat panel;
  an impact absorbing second radiused edge joining one of the pair of elongated edges of the second flat panel to said first flat panel;
  an impact absorbing third radiused edge integrally joining one of said pair of elongated edges of said second flat panel to one of said elongated edges of said third flat panel to form a skeletal triangular shape having a uniform thickness with a uniform thickness and uniform impact absorption so that an impact on one of said radiused edges is absorbed by a flexing of at least two of said flat panels along a longitudinal axis of the dock fender; and
  an end fastener including an end cap for engaging an end of the dock fender so that the dock fender is supported in a vertical condition by hanging the dock fender from the end fastener extending from said end cap.

\* \* \* \* \*